United States Patent [19]

Vazan et al.

[11] Patent Number: 5,271,978
[45] Date of Patent: Dec. 21, 1993

[54] OPTICAL RECORDING MEDIA

[75] Inventors: Fridrich Vazan, Pittsford; Yuan S. Tyan, Webster; Kee C. Pan, Pittsford, all of N.Y.

[73] Assignee: Eastman Kodak Company, Rochester, N.Y.

[21] Appl. No.: 829,798

[22] Filed: Jan. 31, 1992

[51] Int. Cl.$^5$ .............................................. B32B 3/00
[52] U.S. Cl. ......................................... 428/64; 428/65; 428/457; 428/913; 430/495; 430/945; 346/76 L; 346/135.1; 369/288
[58] Field of Search .............. 428/64, 65, 457, 913; 430/945; 346/76 L, 135.1; 369/288

[56] References Cited

U.S. PATENT DOCUMENTS

| 4,579,807 | 4/1986 | Blonder et al. | 428/64 |
| 4,774,170 | 9/1988 | Pan et al. | 428/64 |
| 4,795,695 | 1/1989 | Pan et al. | 428/64 |
| 4,798,785 | 1/1989 | Pan et al. | 428/64 |
| 4,981,772 | 1/1991 | Pan et al. | 428/64 |
| 5,100,700 | 3/1992 | Ide et al. | 428/64 |

OTHER PUBLICATIONS

M. LeContellec et al., "Effects of the Silicon-to-Carbon Ratio and the Hydrogen Content in Amorphous SiC Thin Films Prepared by Reactive Sputtering", *Thin Solid Films* 58 (1979), 407–411.

*Primary Examiner*—Patrick J. Ryan
*Assistant Examiner*—Elizabeth Evans
*Attorney, Agent, or Firm*—John R. Everett

[57] ABSTRACT

Optical recording films made from alloys of antimony-tin and a third element exhibit improved properties when formed in an atmosphere containing oxygen. The amount of oxygen in the sputtering environment is controlled. Improvements include higher amorphous to crystalline transition temperature, improved carrier to noise ratio (CNR) and greater stability of the recorded film.

5 Claims, 2 Drawing Sheets

O2 EFFECT ON SbSnIn NOISE

OPTICAL RECORDING MEDIA

FIELD OF THE INVENTION

This invention relates to antimony-tin-indium and other alloys that are useful in optical recording.

BACKGROUND OF THE INVENTION

Optical recording media made of binary antimony-tin alloy have relatively low amorphous-to-crystalline transition temperatures and hence, are not suitable for applications where severe temperature conditions are to be expected. Further, the carrier-to-noise ratio is about 55 dB for the binary alloy. This is adequate for most applications, but improvement is desirable for more demanding ones.

Indium can be used to stabilize the amorphous phase of the SbSn alloy by increasing the amorphous to crystalline transition temperature. Indium was first selected since its atomic number (49) is similar to that of antimony (51) and tin (50). The use of indium also results in a significant improvement in the carrier-to-noise ratio of the recording process.

Subsequent to the discovery that indium could be used to improve the properties of the antimony-tin alloy, other antimony-tin based alloys were discovered by the present assignee. Thus, applications were filed on antimony-tin alloys containing aluminum (U.S. Pat. No. 4,798,785); zinc (U.S. Pat. No. 4,774,170); and germanium (U.S. Pat. No. 4,795,695).

U.S. Pat. No. 4,981,772 discloses a method of recording using a write-once amorphous alloy layer of SbSnO. While this alloy exhibited a higher amorphous to crystalline transition temperature over the prior art, still further improvement is desirable.

SUMMARY OF THE INVENTION

In accordance with the present invention, it has now been discovered that the presence of oxygen in the sputtering environment improves recording films formed from alloys of SbSn and indium or another third metallic (or semi-metallic) element. The presence of oxygen leads to an increase in the amorphous-to-crystalline transition temperature, a decrease in the recording noise, and an improvement in the stability of the amorphous state of the films. Although the recording sensitivity is somewhat reduced, the other benefits more than offset the sensitivity loss.

Trace amounts of oxygen can unintentionally exist at different levels in sputtering chambers. However, this invention controls the amount of oxygen in the sputtering environment in order to ensure that the concentration of oxygen is sufficient to give the desired results. Also, by controlling the oxygen concentration, the preparation of recording films becomes reproducible.

Thus, in accordance with the present invention, there is provided a method of forming a write-once optical recording film, comprising the steps of:

a) disposing a substrate in a sputtering chamber containing a supply of an inert gas and oxygen;

b) controlling the supply of oxygen in the sputtering chamber to achieve an oxygen concentration that is effective to increase the amorphous-to-crystalline transition temperature, the recording noise, or the stability of the film with respect to recording films of identical composition not formed in a chamber with such oxygen supply;

c) disposing in said chamber a metal alloy target represented by the formula:

$$Sb_a Sn_b X_c$$

where X is an element selected from the group consisting of indium, germanium, aluminum, and zinc; a is between 30 and 98 atomic percent, b is between 0 and 48 atomic percent, and c is between 2 and 60 atomic percent of the alloy metal target; and d) sputtering the metal alloy target of (c) in the oxygen-containing atmosphere of (b) thereby depositing the optical recording film.

In another aspect of the invention there is provided a write-once optical recording film represented by the formula:

$$(Sb_a Sn_b X_c)_{100-d} O_d$$

where X is an element selected from the group consisting of indium, germanium, aluminum, and zinc; O is oxygen and d is an amount that is effective to increase the amorphous-to-crystalline transition temperature, the recording noise, or the stability of the film over recording films of identical SbSnX composition but not containing oxygen; a is between 0.30 and 0.98, b is between 0.0 and 0.48, and c is between 0.02 and 0.60.

It was surprising that by including a third metallic (or semi-metallic) element and small amount of oxygen to the SbSn binary alloy, we were able to increase considerably the stability and performance of the films.

DETAILED DESCRIPTION OF THE INVENTION

Figure 1:
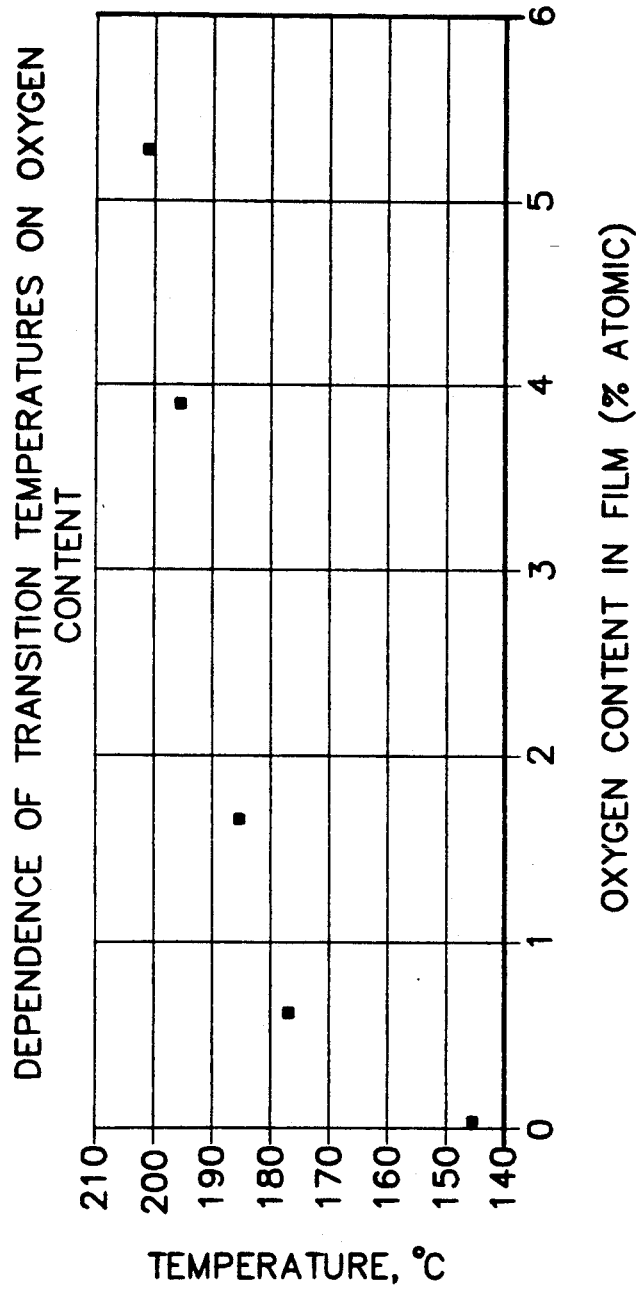
FIG. 1 is a graph showing the effect of oxygen on the amorphous to crystalline transition temperature of a SbSnIn film.

We have found that by controlling the amount of oxygen in the sputtering gas, we can improve the stability and performance of optical recording films of antimony-tin-indium and other antimony-tin based alloys. Moreover, the improvements achieved are reproducible. More specifically, the improvements observed are: an increase in amorphous-to-crystalline transition temperature, a decrease in the recording noise and an improved stability in the recorded films. Stability is judged by the rate of growth of crystalline marks as a function of temperature and time. Films prepared according to the method of the invention demonstrate improvement over films of identical compositions that are not prepared in a sputtering chamber containing oxygen.

Besides indium, other elements which may be added to the antimony-tin alloy include aluminum, zinc, germanium, cadmium, gallium, titanium, silicon, manganese, tellurium, niobium, iron, copper, tungsten, lead, molybdenum, sulfur, nickel, selenium, thallium, arsenic, phosphorous, gold, palladium, platinum, hafnium, and vanadium. Mixtures of these elements are also useful.

Thus, the metal alloy suitable for preparing the film of the invention may be described as $Sb_a Sn_b X_c$ where X is at least one element selected from the group consisting of indium and the elements listed above. The subscripts a, b, and c represent the atomic percent of the elements in the alloy where a is between 30 and 98 atomic percent, preferably between 48 and 80 atomic percent, and most preferably between 55 and 75 atomic percent;

b is between 0 and 48 atomic percent, preferably between 3 and 45 atomic percent, and most preferably between 5 and 40 atomic percent;

c is between 2.0 and 60 atomic percent, preferably between 2 and 40 atomic percent, and most preferably between 2 and 30 atomic percent.

In one embodiment, the metal alloy target has a composition within a polygon in a ternary composition diagram of antimony, indium, and tin; wherein (i) the composition diagram is

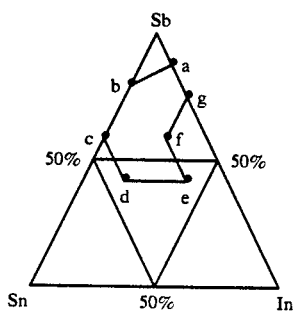

and (ii) the polygon has the following vertices and corresponding coordinates in atom percent

| Vertices | Coordinates | | |
|---|---|---|---|
| | Sb | Sn | In |
| a | 97 | 0 | 3 |
| b | 85 | 15 | 0 |
| c | 60 | 40 | 0 |
| d | 48 | 42 | 10 |
| e | 44 | 10 | 46 |
| f | 64 | 5 | 31 |
| g | 70 | 0 | 30 |

The amount of X to be included in the alloy will depend on the element used and can be determined empirically by routine experimentation well within the skill of the worker in the art.

The amount of oxygen in the sputtering gas should be controlled to an amount that is effective to increase the performance or stability of the film. It should be sufficient to increase the amorphous-to-crystalline transition temperature by at least 15° C. The specific amount will depend on the composition of the SbSnX alloy.

In accordance with the present invention, the amount of oxygen in the sputtering gas is between 0.02 and 10 volume percent, preferably between 0.03 and 7.0 volume percent, and most preferably between 0.03 and 5.3 volume percent in the sputtering gas. In one embodiment of the invention, the volume percent is greater than 1.3.

The amount of oxygen in the sputtering gas is controlled either by premixing an inert gas and oxygen or by individually controlling the flow rate of an inert gas and oxygen into the sputtering chamber.

As explained below, the sputtering chamber and the sputtering gas might unintentionally contain small amount of oxygen which could be incorporated into the film. As shown in FIG. 1 and Table 1, the composition of films, (and therefore their properties) can be affected by oxygen even in this low concentration range. However, the amount of unintentional oxygen is unpredictable and so it is important to control the amount of oxygen in the sputtering environment to make the film reproducible. Moreover, as shown in FIG. 1, the level of oxygen unintentionally present might not be sufficient to produce optimum optical properties.

Deposited films were analyzed using the Rutherford Back Scattering technique (technique discussed in 58 *Thin Solid Films* (1979) 407–411) to determine oxygen concentration. Results are shown in Table I and discussed infra. The composition of the film of the invention is represented by the formula:

$$(Sb_a Sn_b X_c)_{100-d} O_d$$

where X is an element selected from the group consisting of indium, germanium, aluminum, and zinc; O is oxygen and d is an amount that is effective to increase the amorphous-to-crystalline transition temperature, the recording noise, or the stability of the film over recording films of identical SbSnX composition but not containing oxygen; a is between 0.30 and 0.98, b is between 0.0 and 0.48, and c is between 0.02 and 0.60 of the film composition.

In one embodiment, d in the above formula is greater than 0.02 and less than 10. Preferably, d is between 0.03 and 7, most preferably between 0.03 and 5.3.

Optical recording layers can be prepared by conventional thin film deposition techniques such as RF (radio frequency) and DC (direct current) sputtering from an alloy target using the alloys of the invention. Enhancement of sputtering processes by applying magnetic fields (magnetron sputtering) can also be used. The thickness of the films can be from a few tens to a few hundreds of nanometers depending on compromises among factors such as contrast, sensitivity, production rate, material cost, ease of control, data rate, etc. Preferably, the film is about 80 nm thick.

Supports which can be used include plastic plates, such as polyethylene terephthalate, polymethyl methacrylate, and polycarbonate, a glass plate, paper and metallic plates such as aluminum. Flexible supports such as plastic webs can also be used. The recording element can be in the form of a disc, a card, or a tape.

Recording information on the thin film layers made using the alloy of this invention is achieved by focusing an information modulated laser beam on the layer thereby forming a pattern of information on the layer in the form of crystallized areas in an otherwise amorphous layer.

A useful recording material comprises, starting from the outside surface of the recording material, an optional overcoat layer, a thin film optical recording layer and a substrate. In response to a drive signal, the intensity of a diode recording beam focused on the recording layer is modulated in accordance with information to be recorded.

In the case of an optical disc, during recording the recording material is spun at a constant rate, e.g., 1800 rotations per minute (rpm). As a result, a track of information is recorded on the optical recording layer in the form of selected crystallized areas. As recording continues, the recording spot is caused to scan radially across the recording material, thereby causing information to be recorded along a spiral or concentric track. The sizes and spacings of the recorded information marks vary in accordance with the information content of the recording laser drive signal, as well as with radial position on the recording material.

During the readback process, the thus recorded information bearing recording material is spun at the same rate as it was spun during the recording process. The readout laser beam is focused to a playback spot on the recording material by a high numerical aperture lens. The recording material is of the reflective type so that the laser radiation is reflected back through the high numerical aperture lens after interacting with the information marks recorded on the optical recording material. A lens directs reflected laser radiation onto a detector which produces an electrical playback signal in response to temporal variations (contrast) in the irradiance of the reflected laser radiation falling on the detector.

Other types of recording materials are also useful. For example, a reflective substrate such as aluminum can be provided with a recording layer comprising an alloy of the invention on both sides of the substrate. A useful recording material is thus, aluminum coated on both sides with a smoothing layer, a layer to the phase change alloy of the invention and a layer of a clear protective overcoat. In yet another embodiment, the alloy as described is provided on a transparent substrate to form the recording layer. The optical recording layer is then adhered to the recording layer of an identical recording material with an adhesive layer. The thickness of the adhesive layer provides for the optical separation of the two recording layers.

In the examples presented below, the samples were tested for amorphous to crystalline transition temperature. The procedure was as follows. Deposited films to be tested were placed on a hot plate in a flowing nitrogen atmosphere. The films were initially amorphous. The temperature was raised at a rate of 10 milli Kelvin per second. During this heating, the specular reflectance of the surface of the layer is monitored until the entire layer has crystallized and the reflectance has passed a maximum. The data is analyzed and the amorphous to crystalline transition temperature is taken as the temperature at which the sample achieved one half of its total reflectance change.

Also in the examples below, alloys are tested for dynamic performance. A standard test format was used to measure the dynamic performance values. Specifically, coatings were deposited on injection molded polycarbonate disk substrates and tested on a dynamic test stand consisting of an air spindle and an optical head with 830 nm write diode laser utilizing a 0.55 numerical aperture objective lens. The tests were performed using the following conditions: 30 kHz bandwidth, 13 m/s linear velocity, 1.95 μm mark length, and 0.65 mW read power.

Carrier-to-noise were measured with an HP 3585A spectrum analyzer using a 30 KHz resolution bandwidth. Carrier level was measured at the carrier frequency. Noise level was measured at 500 MHz above and below the carrier frequency and averaged. The optimum recording power (dynamic sensitivity) was the power at which a minimum intensity for the second harmonic of the carrier frequency was observed. The performance values presented below are obtainable on any research quality dynamic optical recording test facility that has a sufficiently low system noise level.

The following examples are presented to further illustrate the practice of the invention.

EXAMPLES

Preparation and Analysis of Optical Recording Film

The following examples demonstrate the effects of oxygen in the recording films of the invention. Although SbSnIn films are used in these examples, similar results are expected with other SbSnX films, where X is Ge, Cd, Al, or Zn, alone or in combination.

A series of films were deposited by sputtering from an SbSnIn alloy target with a composition of 70% Sb, 15% In, and 15% Sn. The sputtering was carried out using a 2" Ion Tech direct current (DC) sputtering gun using a power of 50 W, a pressure of 3 mTorr, a gas flow rate of 10 cc/minute in a sputtering gas of either electronic grade Ar or Ar mixed with a small amount of oxygen. The percentage of oxygen in the sputtering gas was controlled by controlling the relative flow rate of Ar and an Ar and oxygen mixture. The amount of oxygen in the argon and oxygen mixture ranged from about 0 to about 5 percent. The oxygen concentration in the recording films was determined by Rutherford Back Scattering technique.

Subsequently, amorphous-to-crystalline transition temperature and mark stability studies (described herein) were carried out on films prepared onto cleaned microscope slide glass substrates. For the dynamic recording performance studies described herein, the films were prepared on injection molded polycarbonate disk substrates.

EXAMPLE 1

The Effect of Oxygen on Crystallization Temperature

Films were prepared and analyzed as described above. The sputtering gas in the chamber during deposition of the various films was controlled to contain either 0, 0.05, 0.1, 1, or 5 volume percent of oxygen. The films were then analyzed by Rutherford Back Scattering technique to ascertain the oxygen concentration in the films formed in different argon with oxygen atmospheres. Crystallization temperatures were determined as described above. The results are shown numerically in Table 1, and graphically in FIG. I.

TABLE I

| Oxygen-Added SbSnIn Films | | |
|---|---|---|
| % (Vol) Intentional Oxygen in the Sputtering Gas | Oxygen Content in the Films (atomic %) | Crystallization Temperatures, °C. |
| 0 | 0.02 | 145 |
| 0.05 | 0.53 | 176 |
| 0.1 | 1.7 | 188 |
| 1 | 3.9 | 192 |
| 5 | 5.3 | 203 |

It is obvious from Table I and FIG. 1 that oxygen concentration in the films correlate directly with the oxygen concentration in the sputtering gas. It is also obvious that there is a direct correlation between the oxygen content in the films and the crystallization temperatures.

Even in the film formed in an atmosphere with no oxygen intentionally added to the sputtering gas, we detected 0.02% oxygen. This finding is not unexpected. A vacuum system used for preparing sputtered films can not be truly void of gases. There will be background pressure which is determined by the speed of the pumps, the tightness of the vacuum system, the length of the time the system is pumped before sputtering, etc. Further, the sputtering gas might also contain a small amount of oxygen. Our data suggests that a small amount of oxygen will be incorporated into the films from these unintentional sources. The results indicate that even these minute amounts of unintentional oxygen can affect the composition of the SbSnIn films although those amounts might not be sufficient to maximize recording properties.

Another equally serious problem is that one can never be sure of the oxygen concentration unintentionally present in the sputtering gas. Since the results show that in the low oxygen concentration range, the film properties depend strongly on the oxygen content in the film, variability in oxygen directly results in product variability. Thus, one advantageous effect of the present invention is that by controlling the amount of oxygen in the sputtering gas, the recording properties of the films can be more reproducible.

We have observed that the increase in amorphous-to-crystalline transition temperature results in a small decrease in recording sensitivity, evidenced by an increase in optimum recording power (ORP). Since the SbSnIn film has excellent sensitivity to begin with, such increase in ORP does not present any problems. On the other hand, an increase in amorphous-to-crystalline transition temperature significantly improves the stability of the amorphous phase.

EXAMPLE 2

Effect of Oxygen on the Stability of Crystalline Mark

Incorporation of oxygen in the sputtering gas also results in an improvement in the stability of laser recorded marks. The crystallization process usually proceeds by a nucleation and growth process. In many cases nucleation is the rate limiting step. An amorphous film may be stable by itself, but the presence of crystalline nuclei, such as laser recorded marks, will result in a rapid crystallization of the film.

Following the same procedures as in Example 1, amorphous films were prepared in the presence of 0%, 0.014%, 0.035% and 0.071% oxygen intentionally added in the sputtering gas.

Laser recorded crystalline marks were then made in the thus-prepared amorphous films and the films subsequently heated to 140° C. Table II shows the heating time required to cause growth of the original laser recorded marks. In the films prepared with 0%, 0.014%, 0.035% and 0.071% oxygen, the required times for growth of the crystalline mark were $1.03 \times 10^5$ seconds, $3.35 \times 10^5$ seconds, $9.00 \times 10^5$ seconds, and $1.18 \times 10^7$ seconds, respectively.

Thus, a significant improvement in the mark stability is achieved by controlling and by increasing the amount of oxygen in the sputtering gas. This experiment was carried out at a high temperature to accelerate the mark growth process, but it has been demonstrated that the growth of crystalline marks will take place over a longer period of time at lower temperatures resulting in a degradation of the recorded information. An improvement in high temperature mark stability is expected to enhance lower temperature mark stability and slow down this degradation process. These results are summarized in Table II below:

TABLE II

Effect of Oxygen on the Stability of Crystalline Marks

| Intentional Oxygen in Sputtering Gas | Time of Heating @ 140° C. to Produce the Mark Growth |
|---|---|
| 0.0 | $1.03 \times 10^5$ seconds |
| 0.014% | $3.35 \times 10^5$ seconds |
| 0.035% | $9.00 \times 10^5$ seconds |
| 0.071% | $1.18 \times 10^7$ seconds |

EXAMPLE 3

Effect of Oxygen on Recording Noise

Figure 2:
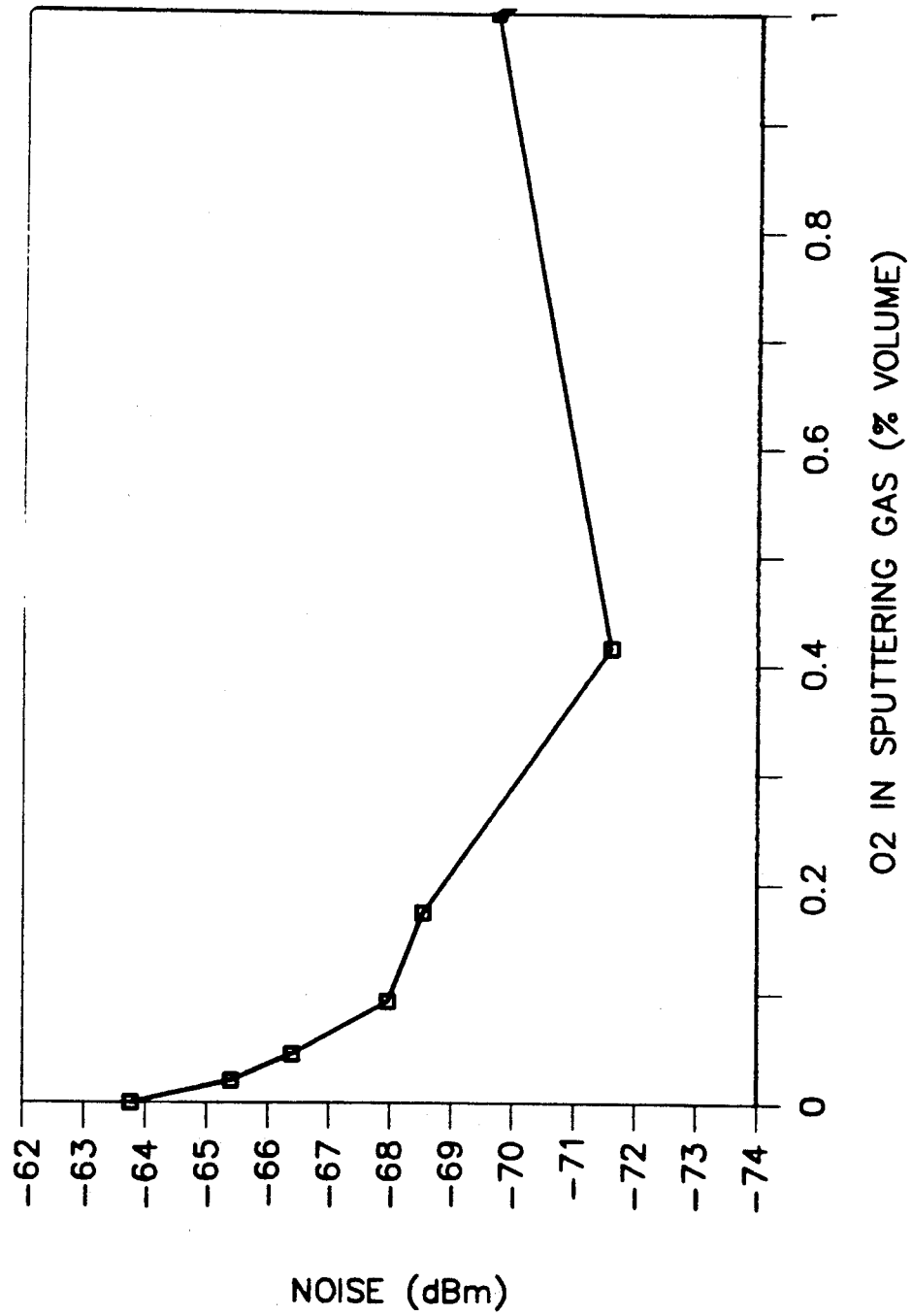
FIG. 2 is a graph showing the effect of oxygen on noise in a SbSnIn film.

FIG. 2 shows the dependence of recording noise on oxygen concentration. Starting with a film without intentional oxygen, the noise is −64 dBm, the introduction of a 0.4% of oxygen into the sputtering gas results in a 7 dBm decrease in recording noise. A corresponding improvement in carrier-to-noise ratio (CNR) is also observed. Such an improvement in CNR will result in a significant improvement in data rate and/or the reliability of the recorded information.

The invention has been described in detail with particular reference to preferred embodiments thereof, but it will be understood that variations and modifications can be effected within the spirit and scope of the invention.

We claim:

1. A write-once optical recording film represented by the formula:

$$(Sb_a Sn_b X_c)_{100-d} O_d$$

where X is an element selected from the group consisting of indium, germanium, aluminum, and zinc; O is oxygen and d is greater than 0.02 and less than 10; a is between 0.30 and 0.98, b is between 0.0 and 0.48, and c is between 0.02 and 0.60.

2. An optical recording film as defined in claim 1 wherein d is greater than 0.03 and less than 7.

3. A optical recording film as defined in claim 1 wherein d is between 0.03 and 5.3.

4. An optical recording film as defined in claim 1 or 2 wherein X is indium.

5. A optical recording film as defined in claim 4 wherein the composition represented by the formula $(Sb_a Sn_b X_c)_{100}$ is within a polygon in a ternary composition diagram of antimony, indium, and tin; wherein (i) the composition diagram is

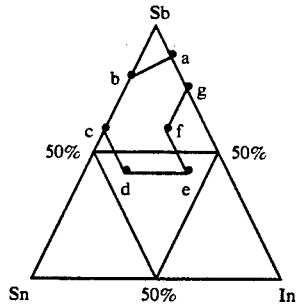

and (ii) the polygon has the following vertices and corresponding coordinates in atom percent

| Vertices | Coordinates | | |
|---|---|---|---|
| | Sb | Sn | In |
| a | 97 | 0 | 3 |
| b | 85 | 15 | 0 |
| c | 60 | 40 | 0 |
| d | 48 | 42 | 10 |
| e | 44 | 10 | 46 |
| f | 64 | 5 | 31 |
| g | 70 | 0 | 30 |

* * * * *